(12) United States Patent
Sutter

(10) Patent No.: US 11,932,416 B2
(45) Date of Patent: Mar. 19, 2024

(54) ESCAPE PATH MARKING FOR AIRCRAFT

(71) Applicant: Lufthansa Technik AG, Hamburg (DE)

(72) Inventor: Wolfgang Sutter, Halstenbek (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 207 days.

(21) Appl. No.: 15/758,744

(22) PCT Filed: Apr. 6, 2016

(86) PCT No.: PCT/EP2016/057463
§ 371 (c)(1),
(2) Date: Mar. 9, 2018

(87) PCT Pub. No.: WO2017/041912
PCT Pub. Date: Mar. 16, 2017

(65) Prior Publication Data
US 2018/0257791 A1 Sep. 13, 2018

(30) Foreign Application Priority Data
Sep. 11, 2015 (DE) .................. 10 2015 217 406.9

(51) Int. Cl.
*B64D 47/02* (2006.01)
*B60Q 3/46* (2017.01)
(Continued)

(52) U.S. Cl.
CPC ............ *B64D 47/02* (2013.01); *B60Q 3/46* (2017.02); *B64D 11/00* (2013.01); *B60Q 3/54* (2017.02); *B64D 2011/0038* (2013.01)

(58) Field of Classification Search
CPC .......... B64D 47/02; B64D 11/00; B60Q 3/46
See application file for complete search history.

(56) References Cited

U.S. PATENT DOCUMENTS 5,961,072 A * 10/1999 Bodle ................. A62B 3/00
244/118.5
6,499,421 B1 * 12/2002 Honigsbaum .......... G09F 19/22
116/205
(Continued)

FOREIGN PATENT DOCUMENTS

DE 102011014701 A1 9/2012
DE 102014101288 A1 8/2015
(Continued)

OTHER PUBLICATIONS

"New pattern matching for SafTGlo", HMGaerospace, Apr. 6, 2011, p. 1.
(Continued)

*Primary Examiner* — David P Porta
*Assistant Examiner* — Casey Bryant
(74) *Attorney, Agent, or Firm* — LEYDIG, VOIT & MAYER, LTD.

(57) ABSTRACT

An escape path marking for an aircraft includes a lighting element, which luminesces in a dark environment, and which emits an emitted light which exits at an outer side of the escape path marking. A transparent protective element is arranged between the lighting element and the outer side of the escape path marking. A planar grid element, which comprises regularly alternating pure-color transparent and opaque regions, is arranged between the lighting element and the outer side of the escape path marking. A transparent pigmented element is formed and arranged between lighting element and the outer side of the escape path marking such that in an event of external illumination according to at least one predefined illumination scenario, a predefined first color tone results on the outer side of the escape path marking at the transparent regions of the grid element.

20 Claims, 4 Drawing Sheets

(51) Int. Cl.
  *B60Q 3/54* (2017.01)
  *B64D 11/00* (2006.01)

(56) References Cited

U.S. PATENT DOCUMENTS

2011/0296727 A1* 12/2011 Savagian .............. B32B 27/308
  40/594
2015/0096209 A1 4/2015 Biehl et al.

FOREIGN PATENT DOCUMENTS

| EP | 1458221 A2 | 9/2004 |
| EP | 2717245 A2 | 4/2014 |
| GB | 2332081 A | 6/1999 |
| GB | 2448424 A | 10/2008 |
| GB | 2512498 A | 10/2014 |
| JP | H11222578 A | 8/1999 |
| TW | 201013601 A | 4/2010 |
| TW | M 396754 U | 1/2011 |
| WO | WO 9633093 A1 | 10/1996 |
| WO | WO 02067230 A1 | 8/2002 |
| WO | WO 2007039673 A1 | 4/2007 |
| WO | WO 2013149719 A1 | 10/2013 |

OTHER PUBLICATIONS

"STG Aerospace unveils the latest innovation in photoluminescent (PL) floorpath marking; a unique pattern matching service", The Official Aircraft Interiors Expo 2011 Show Review, Sep. 12-14, 2011, p. 5.

"SafTglo: Leading and lighting the way", Aircraft Interiors Trade Show, Apr. 2013, p. 2.

"The world's leading PL floorpath marking solution", Aircraft Interiors Trade Show, Apr. 2013, p. 1.

* cited by examiner

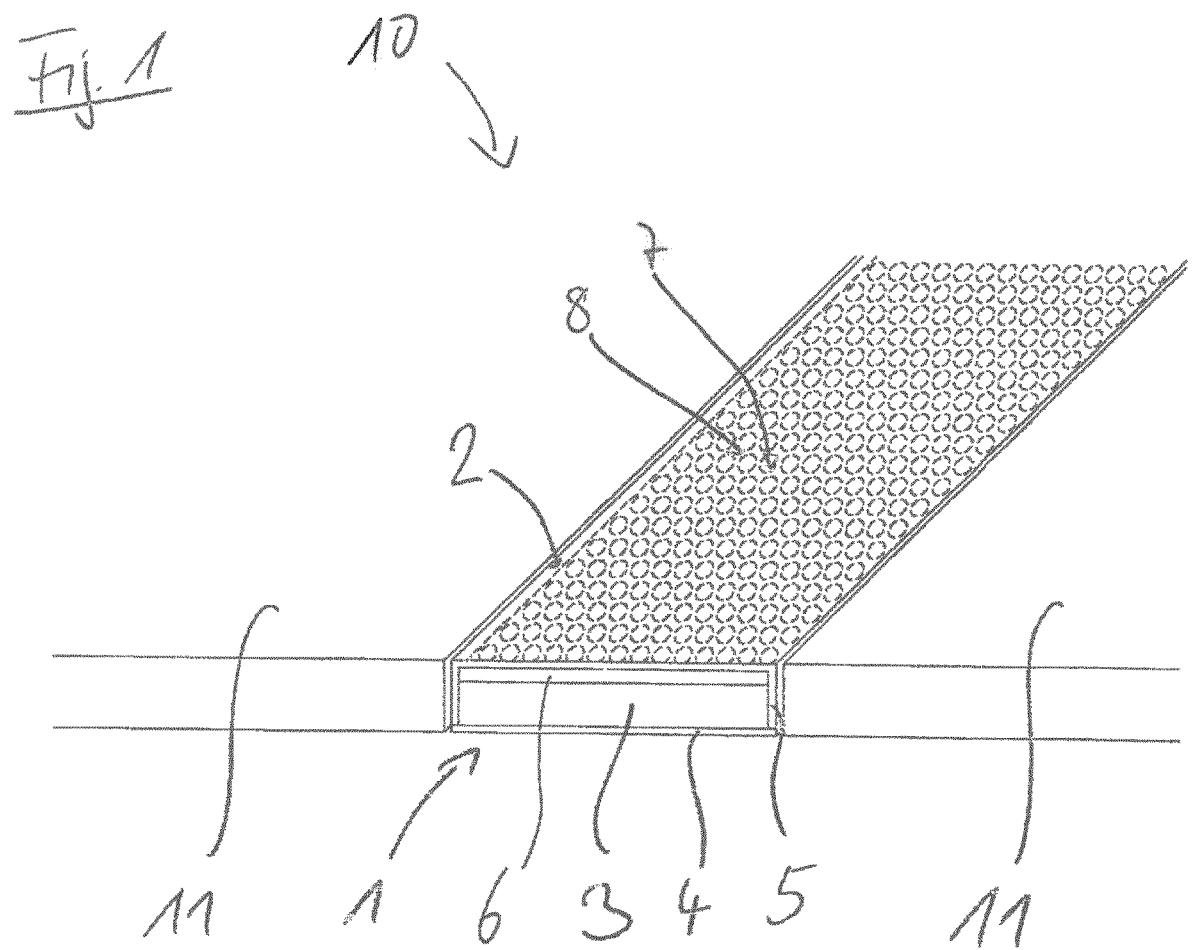

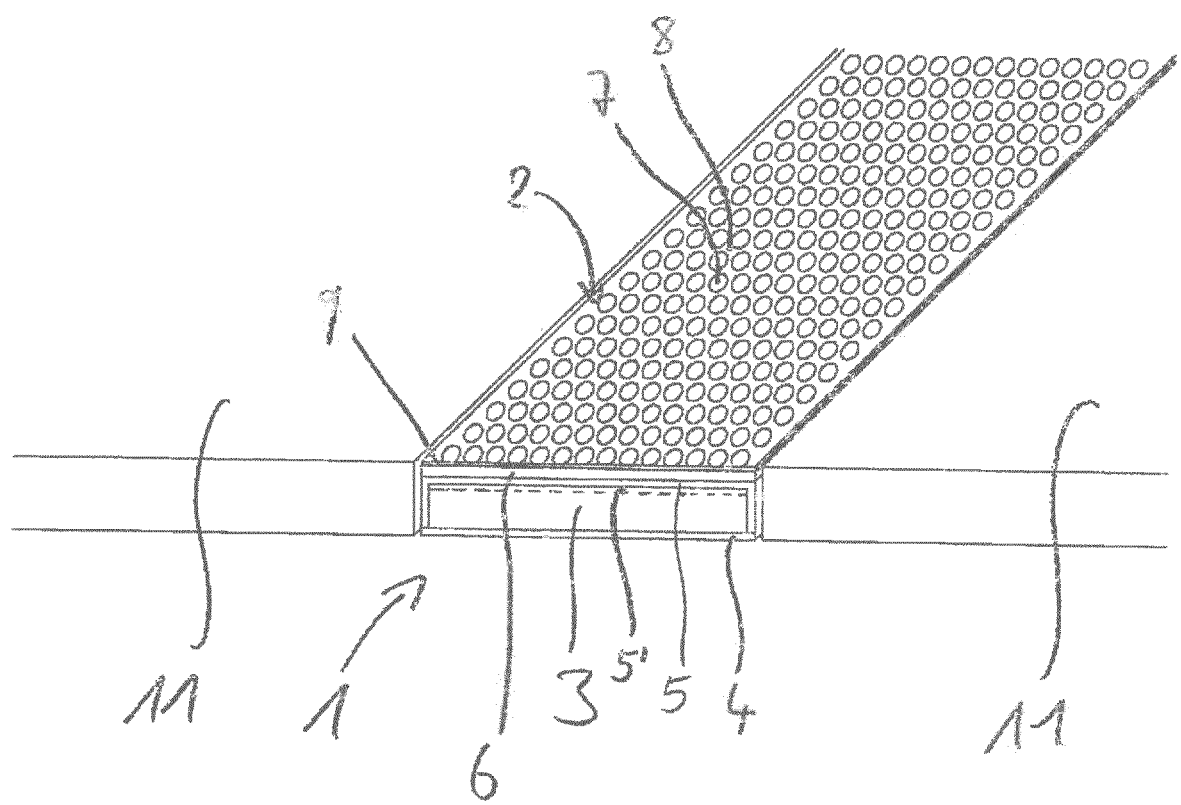

ESCAPE PATH MARKING FOR AIRCRAFT

CROSS-REFERENCE TO PRIOR APPLICATIONS

This application is a U.S. National Stage Application under 35 U.S.C. § 371 of International Application No. PCT/EP2016/057463 filed on Apr. 6, 2016, and claims benefit to German Patent Application No. DE 10 2015 217 406.9 filed on Sep. 11, 2015. The International Application was published in German on Mar. 16, 2017 as WO 2017/041912 A1 under PCT Article 21(2).

FIELD

The invention relates to escape path markings for aircraft and also an arrangement of an escape path marking and a floor covering.

BACKGROUND

In commercial aircraft, the use of an escape path marking system close to the floor is absolutely necessary to show the path to the emergency exits to passengers in case of emergency in the event of darkness and failure of the cabin lighting.

In addition to electrically operated systems, photoluminescent systems are also known for this purpose. These systems consist of strip-shaped elements, which store energy from the cabin lighting in the normal operating state of the aircraft and emit it again in darkness in the form of visible light.

Since the escape path markings are only provided for an emergency, there is great interest in the markings standing out as little as possible in the normal operating state of the aircraft. In addition to the goal of an appealing design of the interior of an aircraft cabin, the emergency systems of an aircraft are also to be designed to be generally as unobtrusive as possible, so that passengers with fear of flying are not continuously reminded of the possibility of an emergency by immediately recognizable emergency systems.

For this purpose, arranging a color filter above a photoluminescent layer, which generally appears whitish or yellowish in daylight, and below a transparent protective layer for protecting the photoluminescent layer from damage, which color filter is designed so that it at least partially absorbs or reflects a part of the light incident on the film in specific wavelength ranges, while it is transmissive for the remaining wavelength ranges, is known. By way of corresponding color filters, in the typical lighting situations in an aircraft cabin, the appearance of the escape path marking can be adapted to a predefined coloration in a normal operating state of the aircraft, while at the same time sufficient light reaches the photoluminescent layer to "charge" the photoluminescent pigments thereof. In darkness, light from these pigments is emitted through the color filter so it is visible to the passengers.

To ensure the latter to a sufficient extent, the color filters have to have a high transmittance at least in the wavelength range required for the charging of the photoluminescent pigments in the photoluminescent layer and also in the wavelength range in which these pigments emit light. As a result, exclusively a bright coloration of the escape path markings may be achieved by the color filters in typical lighting situations of an aircraft cabin. Moreover, only homogeneously colored surfaces may be achieved by corresponding color filters, which possibly still stand out in spite of color equalization from, for example, floor coverings arranged adjacent thereto, such as patterned carpets.

To improve the variability of the design of escape path markings, providing a perforated film having a latticed structure made of passages surrounded by the material of the film instead of a color filter between photoluminescent layer and protective layer has furthermore been studied. The film can be printed in this case with an arbitrary pattern. At the same time, the passages of the film are sufficient to ensure the charging and the emission of light of the underlying photoluminescent layer to an extent sufficient for the use as an escape path marking. Furthermore, due to sufficiently small passages and small distances between adjacent passages, the human eye can no longer resolve the structure of the perforated film in distances between the eye of the observer and escape path marking typical upon use in aircraft, whereby the perforated film is no longer perceived as such and color impressions result from the mixture of the color of the perforated film and the color of the underlying photoluminescent layer—i.e., frequently white to yellow. By suitable printing of the perforated film, a variety of patterns may thus be implemented, which are visible in the case of the typical lighting situations in an aircraft cabin in a normal operating state of the aircraft, wherein the functionality as the escape path marking in darkness remains ensured at the same time.

The described use of perforated film has the disadvantage that only a comparatively bright coloration, but in particular no muted colors may still be achieved.

SUMMARY

In an embodiment, the present invention provides an escape path marking for an aircraft. The escape path marking includes a lighting element, which luminesces in a dark environment, and which emits an emitted light which exits at an outer side of the escape path marking. A transparent protective element is arranged between the lighting element and the outer side of the escape path marking. A planar grid element, which comprises regularly alternating pure-color transparent and opaque regions, is arranged between the lighting element and the outer side of the escape path marking. A transparent pigmented element is formed and arranged between lighting element and the outer side of the escape path marking such that in an event of external illumination according to at least one predefined illumination scenario, a predefined first color tone results on the outer side of the escape path marking at the transparent regions of the grid element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1: shows a schematic illustration of a first exemplary embodiment of an arrangement according to the invention having escape path marking;

FIG. 2: shows a schematic illustration of a second exemplary embodiment of an arrangement according to the invention having escape path marking;

DETAILED DESCRIPTION

Figure 3A:
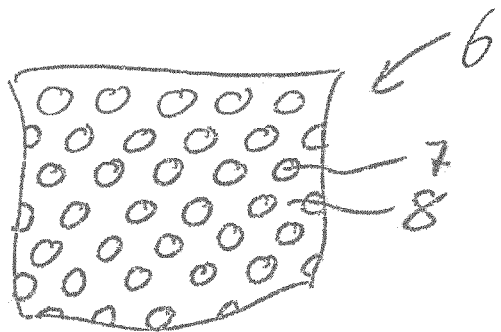
FIG. 3a: shows a first example of the design of grid elements for use in an arrangement according to FIG. 1 or 2.

Embodiments of the present invention provide an escape path marking and an arrangement of escape path marking and floor covering, in which the above-mentioned disadvantages no longer occur or only still occur to a reduced extent.

An embodiment of the present invention accordingly provides an escape path marking for aircraft, comprising a lighting element which luminesces in the dark, and the emitted light of which exits on an outer side of the escape path marking, and a transparent protective element arranged between the lighting element and the outer side of the escape path marking, wherein a planar grid element is provided between the lighting element and the outer side of the escape path marking, which comprises regularly alternating pure-color transparent and opaque regions, and wherein a transparent pigmented element is designed and arranged between the lighting element and the outer side of the escape path marking such that in the event of external illumination according to at least one predefined illumination scenario, a predefined first color tone results on the outer side of the escape path marking at the transparent regions of the grid element.

Another embodiment of the present invention provides an arrangement of an escape path marking and a floor covering arranged adjacent to the escape path marking, wherein the escape path marking is embodied according to the invention and designed such that in the event of external illumination of the arrangement according to at least one predefined illumination scenario, a pattern adapted to the pattern of the floor covering results on the outer side of the escape path marking.

Firstly, several terms used in conjunction with the invention will be explained:

In addition to the brightness and color saturation, "color tone" refers to the property of a color perceived as fundamental by a human. The color tone can be represented, inter alia, in an HSV (Hue, Saturation, Value) color space as a color angle.

A region or an element is "transparent" in the meaning of this invention if it has a transmittance for visible light of greater than 0.7, preferably greater than 0.9. In the case of regions or elements having a filter action for light passing through, the requirement for the transmittance relates to the wavelength ranges of the light which are not filtered out by the region or the element.

A transparent region is "pure-color" if light passing through the region remains essentially unchanged with respect to its color tone. In particular color filters or pigmented transparent components are not pure-color, while, for example, a window pane or the windshield of an automobile is generally pure-color.

A transparent component is "pigmented" or "toned" if the degree of its transparency is different for different wavelengths of the light, whereby a certain filter action results for the wavelength ranges in which the transparency is lower. A transparent pigmented component is accordingly not pure-color.

A region is considered "opaque" in the meaning of the invention if the opacity of the region is at least 10, preferably at least 50.

"External illumination" is understood in conjunction with the invention as an illumination of an escape path marking from the outside using a light source, in which the quantity of light which is reflected by the escape path marking and exits at the outer side of the escape path marking is at least twice, preferably five times greater than the quantity of light which is emitted by the luminescent lighting element and exits at the outer side of the escape path marking. A corresponding external illumination is necessary, inter alia, to charge the lighting element such that it also actually luminesces as desired when the external illumination is taken away.

An "illumination scenario" describes one or more typical illumination situations, as can occur at the final usage location of the escape path marking. In the case of escape path markings on board an aircraft, typical illumination scenarios can be, for example, the illumination by sunlight, which enters through the cabin window into the cabin, or the illumination by the cabin lighting. If the cabin lighting is variable in brightness and/or color to provide various illumination situations, these various illumination situations can each represent separate illumination scenarios.

The options for which pattern or which color can be depicted on an escape path marking in the externally illuminated state are significantly increased by the transparent pigmented element provided according to the invention. This is because, in that a color tone of the escape path marking fundamentally deviating from the color of the lighting element is achieved by the pigmented element, in conjunction with the grid element, an increased number of patterns or colors which are finally visible on the escape path marking can be achieved. A "base tone" of the escape path marking deviating from the color of the illuminant is achieved by the transparent pigmented element. The actual pattern or the final color can be generated by the grid element based on this base tone. In contrast to the prior art, in which the finally perceived patterns result from color impressions from the mixture of the colors of a perforated film and an underlying white or yellow photoluminescent layer, by way of the pigmentation, in the event of external illumination, a visible pattern or color results on the outer side of the escape path marking from color impressions of the mixture of the color(s) of the grid element and the base tone. Because the base tone can be selected as deviating from the color of the illuminant (generally white or yellow), strongly improved design options result for the escape path marking with respect to the coloration of a pattern or the color visible in the event of external illumination on the outer side of the escape path marking.

Of course, the transparent pigmented element has to be designed such that the functionality of the escape path marking is maintained. In particular, the pigmentation is thus to be designed so that in the event of external illumination, for example, by the cabin light, a sufficient quantity of light reaches the lighting element through the protective element, the transparent pigmented element, and the transparent regions of the grid element to charge it sufficiently so that the lighting element and/or the escape path marking luminesce sufficiently brightly and lastingly in case of emergency. The lighting element can be made of photoluminescent material in this case, according to the known prior art. The corresponding safety-related boundary conditions generally do not represent a restriction with respect to the color tone of the pigmentation and the predefined first color tone, but because of the required transmittance resulting from the boundary conditions, they do not permit an arbitrarily dark color impression at the transparent regions of the grid element on the outer side of the escape path marking in the event of external illumination according to a predefined illumination scenario. A correspondingly dark color impression can be generated, however, by suitable design of the grid element, in particular with respect to its color design.

The transparent pigmented element can be a color film, which is arranged between protective element and lighting element. However, it is particularly preferable if the protective element is in itself correspondingly pigmented to form the transparent pigmented element. In this case, the transparent pigmented element is thus formed directly by the protective element, whereby the number of the components of the escape path marking according to the invention can be reduced.

If a pattern desired on the outer side of the escape path marking in the event of external illumination is multicolored, it is preferable for the predefined first color tone to be a color tone of the desired pattern. Furthermore—if the safety-related boundary conditions permit this—it is preferable for the transparent pigmented element to be designed so that in the event of external illumination according to at least one predefined illumination scenario, not only a predefined first color tone, but rather also a predefined brightness and/or saturation results, which preferably corresponds to those of the pattern at the brightest point having the predefined first color tone.

It is preferable for the opaque regions of the grid element to be pigmented such that in the event of external illumination according to the at least one predefined illumination scenario, a predefined second color tone or a predefined multicolored pattern results on the outer side of the escape path marking at the opaque regions of the grid element. By way of corresponding design of the grid element, the final desired color or the final desired pattern can be implemented. If the transparent pigmented element is arranged between outer side of the escape path marking and the grid element, it thus has to be taken into consideration in this design of the grid that it is visible from the outside only through the transparent pigmented element.

The transparent and opaque regions of the grid element preferably alternate such that adjacent regions can no longer be separately perceived from a distance of at least 90 cm from the outer side of the escape path marking at a resolution of at least 2.0 arc minutes, preferably at least 0.5 arc minutes, more preferably at least 0.3 arc minutes. It can be ensured by a corresponding design of the grid element that a transparent region is fundamentally perceived together with at least one opaque region of the grid element, whereby the colors of these regions are also perceived as mixed.

It is preferable if the opaque regions of the grid element have a mean diameter of 0.25 mm to 2 mm, preferably 0.25 mm to 1 mm. The mean distance of two adjacent opaque regions is preferably 0.3 mm to 4 mm, more preferably 0.3 mm to 2 mm.

The transparent regions of the grid element preferably have a mean diameter of 0.25 mm to 2 mm, preferably 0.25 mm to 1 mm. The mean distance between two adjacent transparent regions is preferably 0.3 mm to 4 mm, more preferably 0.3 to 2 mm.

It is preferable if the grid element is arranged between the outer side of the escape path marking and the protective element. In this case, it can be applied directly to the protective element as printing ink(s) in a printing method, preferably in a digital printing method. A scratch protection lacquer is preferably applied over the grid element in particular in this case. The reflections on the outer side of the escape path markings can be significantly reduced by the corresponding arrangement of the grid element, whereby the overall impression of the escape path marking also significantly improves, in particular, for example, in comparison to a carpet arranged adjacent to the escape path marking.

The thickness of the printed grid element is preferably less than 100 µm, more preferably between 20 and 30 µm. The thickness of the scratch protection lacquer layer is preferably less than 50 µm, more preferably between 5 and 15 µm.

The printing ink(s) of the grid element and/or the scratch protection lacquer are preferably UV-curing. If both are UV-curing, they can be cured simultaneously. The printing ink(s) of the grid element and/or the scratch protection lacquer can comprise polymers containing acrylate groups or can consist thereof.

The arrangement of the grid element between the outer side of the escape path marking and the protective element and also the refinements in this respect possibly deserve separate protection. In particular, a corresponding arrangement can also be provided if a transparent pigmented element and/or a pigmented protective element is not provided. The other advantageous refinements mentioned here—in particular of the grid element—also remain valid, of course, with such a design.

The transparent regions of the grid element are preferably blank spaces. The grid element is similar in this case to a lattice having gaps, which extend over the entire thickness of the lattice, between webs which form the opaque regions of the grid element.

The area fraction of opaque regions of the grid element is preferably between 20% and 80% in relation to its total area. With an area fraction in the lower region of this range, visible, if also rather bright patterns may be generated on the outer side of the escape path marking in the event of external illumination. In the upper region of this range, darker patterns having greater contrasts may also be achieved, wherein the desired functionality as a luminescent escape path marking can still be ensured.

The transparent regions of the grid element are preferably designed as geometrically regular shapes, for example, circles or polygons, in particular hexagons. The production of the grid element may thus be significantly simplified.

A first exemplary embodiment of an arrangement 10 according to the invention of a floor covering 11 and an escape path marking 1 is schematically illustrated in FIG. 1. The escape path marking 1 is incorporated into the floor covering 11 in this case so that the outer side 2 of the escape path marking 1 is planar with the upper side of the floor covering 11, whereby an overall level surface of the arrangement 10 results.

The escape path marking 1 comprises a lighting element 3, which luminesces in the dark, made of photoluminescent material, the emitted light of which exits at the outer side 2 of the escape path marking 1. A transparent protective element 5, which encloses the lighting element 3 together with a floor element 4, is arranged enclosing the lighting element 3, and therefore between the lighting element 3 and the outer side 2. The protective element 5 and the floor element 4 can be permanently connected to one another to form a seal in this case, so that no liquid, inter alia, from the surroundings, can reach the lighting element 3 and possibly damage it. It is also possible to embody the floor element 4 integrally with the protective element 5.

Furthermore, a grid element 6 is arranged between lighting element 3 and the outer side 2 of the escape path marking 1. The grid element 6 is arranged in the exemplary embodiment according to FIG. 1 inside the protective element 5 and is therefore only illustrated as a dashed line in large parts. It comprises regularly alternating pure-color transparent regions 7 and opaque regions 8. The transparent regions 7 are formed as blank spaces in this case. The grid element 6 can be, for example, a perforated film. The grid element 6 can alternatively also be, for example, a pattern applied in digital printing.

The protective element 5 and the opaque regions 8 of the grid element 6 are pigmented such that in the event of external illumination of the arrangement 10 according to at least one predefined illumination scenario, a pattern adapted to the pattern of the floor covering 11 results on the outer side 2 of the escape path marking 1. The protective element 5 is pigmented in this case such that in the event of external illumination according to the predefined illumination scenario, a predefined first color tone results on the outer side 2 of the escape path marking 1 at the transparent regions 7 of the grid element 6, which corresponds to a color tone of the pattern of the floor covering 11. Because of its coloration, the protective element 5 therefore simultaneously also forms the transparent pigmented element provided according to the invention, which therefore also, as provided according to the invention, is arranged between lighting element 3 and the outer side 2 of the escape path marking 1.

A second exemplary embodiment of an arrangement 10 according to the invention of a floor covering 11 and an escape path marking 1 is schematically illustrated in FIG. 2. The second exemplary embodiment is similar in this case in large parts to the first exemplary embodiment according to FIG. 1, because of which reference is made to the corresponding statements and the differences between the two exemplary embodiments are discussed in particular hereafter.

In the second exemplary embodiment, the grid element 6 is no longer arranged inside but rather outside the protective element 5. For this purpose, the grid element 6 is applied in the form of printing inks in a digital printing method directly to the protective element 5 and provided with a layer made of scratch protection lacquer 9. Both the printing inks of the grid element 6 and also the lacquer of the scratch protection layer 9 are UV-cured. The lighting element 3 is still protected by the protective element 5 and the floor element 4.

The protective element 4 and the opaque regions 8 of the grid element 6 are also pigmented in the second exemplary embodiment so that in the event of external illumination of the arrangement 10 according to at least one predefined illumination scenario, a pattern adapted to the pattern of the floor covering 11 also results on the outer side 2 of the escape path marking 1. The protective element 5 is pigmented in this case such that in the event of external illumination according to the predefined illumination scenario, a predefined first color tone results on the outer side 2 of the escape path marking 1 at the transparent regions 7 of the grid element 6, which corresponds to a color tone of the pattern of the floor covering 11. Since the protective element 5 already forms the transparent pigmented element because of the pigmentation, a separate corresponding element can be omitted.

If the protective element 5 itself is not pigmented or intended to be, alternatively thereto a color film can also be provided as a transparent pigmented element between lighting element 3 and protective element 5. A corresponding color film is indicated by the dashed line 5' in FIG. 2.

The actual production of the escape path marking 1 can fundamentally take place as desired. In particular, the methods known in the prior art can be used. In one of these methods, all elements of the escape path marking 1 are produced separately and then assembled. In another method, the lighting element 3 is introduced in a casting-like procedure in the liquid state directly into a prefinished protective element 5 and permanently bonds upon curing to the walls of the protective element 5. If the grid element 6 is to be arranged inside the protective element 5, it can be laid in the protective element 5 before the mentioned casting-like procedure or applied in a printing method to the inner side of the protective element 5.

FIGS. 3a-d and 4 show various design variants of grid elements 6, as can be used in the arrangements 10 and/or in the escape path markings 1 according to FIGS. 1 and 2. A portion of the respective grid elements 6 is shown in each of the figures in this case.

The grid element 6 according to FIG. 3a comprises regularly arranged transparent and opaque regions 7, 8, wherein the transparent regions 7 are formed in a circular manner and arranged such that the distance between each two adjacent transparent regions 7 is essentially equal over the entire grid.

Figure 3B:
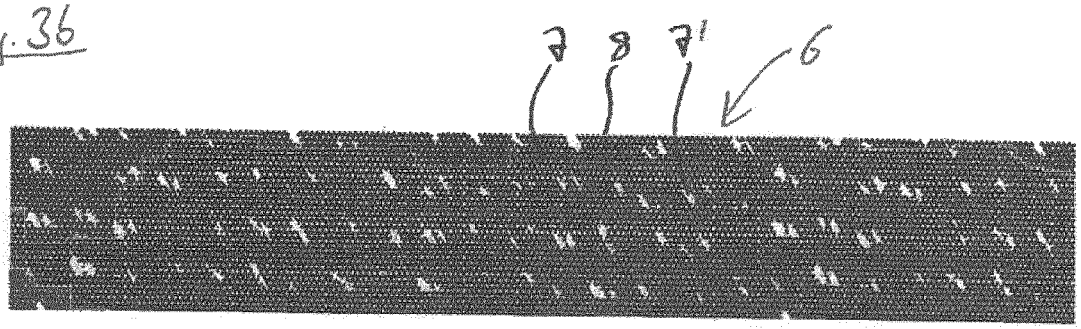
FIG. 3b: shows a second example of the design of grid elements for use in an arrangement according to FIG. 1 or 2.

The grid element 6 according to FIG. 3b is based on that according to FIG. 3a, wherein the grid is penetrated by enlarged blank spaces 7' at some points, however. Particularly bright points of a pattern may be achieved by a corresponding design of the grid.

Figure 3C:
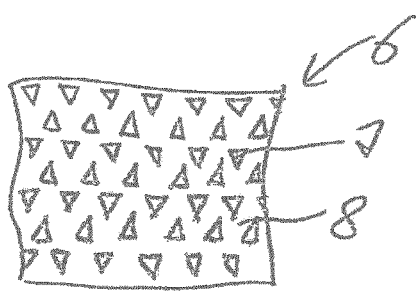
FIG. 3c: shows a third example of the design of grid elements for use in an arrangement according to FIG. 1 or 2.

The grid element 6 according to FIG. 3c also comprises regularly arranged transparent and opaque regions 7, 8, wherein the transparent regions 7 are designed as polygons—in the illustrated exemplary embodiment as triangles.

Figure 3D:
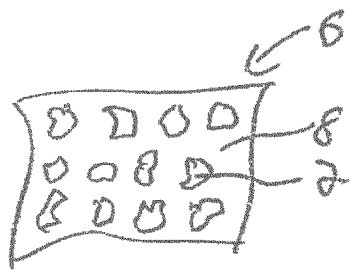
FIG. 3d: shows a fourth example of the design of grid elements for use in an arrangement according to FIG. 1 or 2.

The regularly arranged transparent regions 7 in the grid element 6 according to FIG. 3d are distinguished in that they have an irregular shape themselves.

Figure 4:
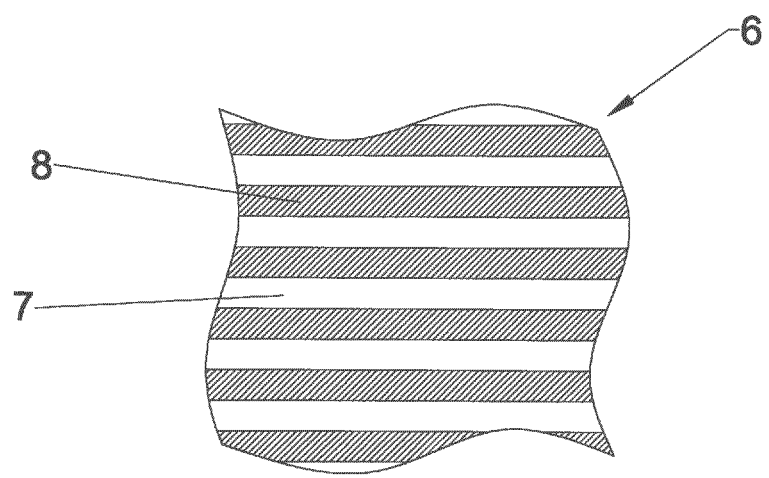
FIG. 4: shows a fifth example of the design of a grid element for use in an arrangement according to FIG. 1 or 2.

In the grid element 6 according to FIG. 4, the transparent and opaque regions 7, 8 are designed as lines extending in parallel, which alternate regularly.

In all embodiments according to FIGS. 3a-d, but also according to FIG. 4, the transparent and opaque regions 7, 8 of the grid element 6 alternate such that adjacent regions 7, 8 can no longer be perceived separately from a distance of at least 90 cm from the outer side 2 of the escape path marking 1 at a resolution of at least 2.0 arc minutes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An escape path marking for an aircraft, the escape path marking comprising:
    a lighting element, which luminesces in a dark environment, and which emits an emitted light, having an illuminant color tone, which exits at an outer side of the escape path marking;
    a transparent protective element arranged between the lighting element and the outer side of the escape path marking;
    a planar grid element, which comprises regularly alternating pure-color transparent regions and opaque regions, arranged between the lighting element and the outer side of the escape path marking, wherein the planar grid element has a latticed structure, wherein the transparent regions and the opaque regions of the grid element alternate such that adjacent regions are not perceivable separately from a distance of at least 90 cm from the outer side of the escape path marketing at a resolution of at least 2.0 arc minutes, and the mean distance between two adjacent opaque regions is 0.3 mm to 4 mm,
    wherein a transparent pigmented element is formed and arranged between the lighting element and the outer side of the escape path marking, covering an entire upper surface of the lighting element, such that in an event of external illumination according to at least one predefined illumination scenario, a predefined base color tone results on the outer side of the escape path marking at the transparent regions of the grid element,
    wherein the planar grid element and the transparent pigmented element are arranged such that, in the event of external illumination according to at least one predefined illumination scenario, a final visible pattern or color perceivable at the outer side the escape path marking results from color impressions from a mixture of colors of the opaque regions of the planar grid element and the base color tone provided by the transparent pigmented elements in all of the transparent regions of the planar grid element, and
    wherein the base tone deviates from the illuminant color tone.

2. The escape path marking as claimed in claim 1, wherein the protective element is pigmented to form the transparent pigmented element or the transparent pigmented element is a color film.

3. The escape path marking as claimed in claim 1, wherein the opaque regions of the grid element are pigmented such that in the event of external illumination according to the at least one predefined illumination scenario, a predefined second color tone or a predefined multicolored pattern results on the outer side of the escape path marking at the opaque regions of the grid element the final visible pattern or color comprising the predefined second color tone or the predefined multicolored pattern.

4. The escape path marking as claimed in claim 1, wherein the predefined base color tone is a first color tone of a predefined multicolored pattern the final visible pattern or color comprising the predefined multicolored pattern.

5. The escape path marking as claimed in claim 1, wherein the transparent pigmented element is pigmented such that in the event of external illumination according to the at least one predefined illumination scenario, a predefined brightness or a predefined saturation results on the outer side of the escape path marking at the transparent regions of the grid element.

6. The escape path marking as claimed in claim 5, wherein the predefined base color tone is a first color tone of a predefined multicolored pattern, and wherein the predefined brightness or the predefined saturation which results on the outer side of the escape path marking at the transparent regions of the grid element corresponds to that of the predefined pattern at a brightest point having the predefined first color tone.

7. The escape path marking as claimed in claim 1, wherein the grid element is arranged between the outer side of the escape path marking and the protective element.

8. The escape path marking as claimed in claim 7, wherein the thickness of the grid element is less than 100 μm, or the thickness of a scratch protection lacquer layer is less than 50 μm.

9. The escape path marking as claimed in claim 8, wherein the thickness of the grid element is between 20 and 30 μm, or the thickness of the scratch protection lacquer layer is between 5 and 15 μm.

10. The escape path marking as claimed in claim 7, wherein the grid element is applied as at least one printing ink in a printing method to the protective element or a scratch protection lacquer is applied over the grid element, and wherein the at least one printing ink of the grid element or the scratch protection lacquer is UV-curing.

11. The escape path marking as claimed in claim 1, wherein the transparent regions of the grid element are blank spaces.

12. The escape path marking as claimed in claim 1, wherein an area fraction of the opaque regions of the grid element in relation to a total area of the grid element is between 20% and 80%.

13. The escape path marking as claimed in claim 1, wherein the transparent regions of the grid element have geometrically regular shapes.

14. An arrangement comprising:
    an escape path marking for an aircraft, the escape path marking comprising:
    a lighting element, which luminesces in a dark environment, and which emits an emitted light, having an illuminant color tone, which exits at an outer side of the escape path marking;
    a transparent protective element arranged between the lighting element and the outer side of the escape path marking;
    a planar grid element, which comprises regularly alternating pure-color transparent regions and opaque regions, arranged between the lighting element and the outer side of the escape path marking, wherein the planar grid element has a latticed structure, wherein the transparent regions and the opaque regions of the grid element alternate such that adjacent regions are not perceivable separately from a distance of at least 90 cm from the outer side of the escape path marketing at a resolution of at least 2.0 arc minutes, and the mean distance between two adjacent opaque regions is 0.3 mm to 4 mm, wherein a transparent pigmented element is formed and arranged between the lighting element and the outer side of the escape path marking, covering an entire upper surface of the lighting element, such that in an event of external illumination according to at least one predefined illumination scenario, a predefined base color tone results on the outer side of the escape path marking at the transparent regions of the grid element, wherein the planar grid element and the transparent pigmented element are arranged such that, in the event of external illumination according to at least one predefined illumination scenario, a final visible pattern or color perceivable at the outer side the escape path marking results from color impressions from a mixture of colors of the opaque regions of the planar grid element and the base color tone provided by the transparent pigmented elements in all of the transparent regions of the planar grid element, wherein the base tone deviates from the illuminant color tone; and a floor covering arranged adjacent to the escape path marking, wherein the escape path marking is designed such that, in the event of external illumination of the arrangement according to the at least one predefined illumination scenario, a pattern adapted to mimic the pattern of the floor covering results on the outer side of the escape path marking, the final visible pattern comprising the pattern, and wherein the escape path marking is designed such that, in an event of the dark environment, which is different from the event of external illumination of the arrangement according to the at least one predefined illumination scenario, the lighting element is configured to emit the emitted light which exits at the outer side of the escape path marking to create an escape path pattern that is different from the final visible pattern or color perceivable during the at least one predefined illumination scenario.

15. The arrangement as claimed in claim 14, wherein the floor covering is a carpet.

16. The arrangement as claimed in claim 15, wherein the carpet is multicolored.

17. The arrangement of claim 14, wherein the emitted light of the lighting element, follows a path which exits a top planar surface of the lighting element, enters a bottom planar surface of the transparent protective element, exits a top planar surface of the transparent protective element, enters a bottom planar surface of the planar grid element, and exits a top planar surface of the planar grid element.

18. The arrangement of claim 17, wherein the transparent protective element comprises the transparent pigmented element, and wherein the transparent protective element encapsulates at least three sides of the lighting element including completely covering the top planar surface of the lighting element.

19. The escape path marking as claimed in claim 1, wherein the transparent and opaque regions of the grid element alternate such that the adjacent regions are not perceivable separately from a distance of at least 90 cm from the outer side of the escape path marking at a resolution of at least 0.3 arc minutes.

20. The escape path marking as claimed in claim 1, wherein the opaque regions or the transparent regions of the grid element have a mean diameter of 0.25 mm to 1 mm or the mean distance between two adjacent opaque regions is 0.3 mm to 2 mm.

\* \* \* \* \*